(No Model.)
C. A. PRATT.
AIR CUSHIONED TIRE.
No. 599,475. Patented Feb. 22, 1898.
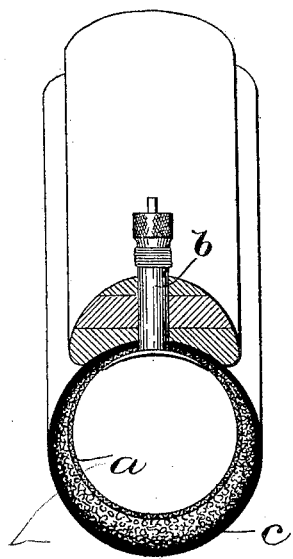
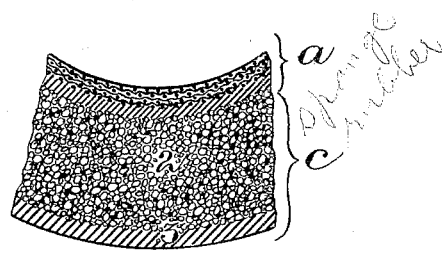
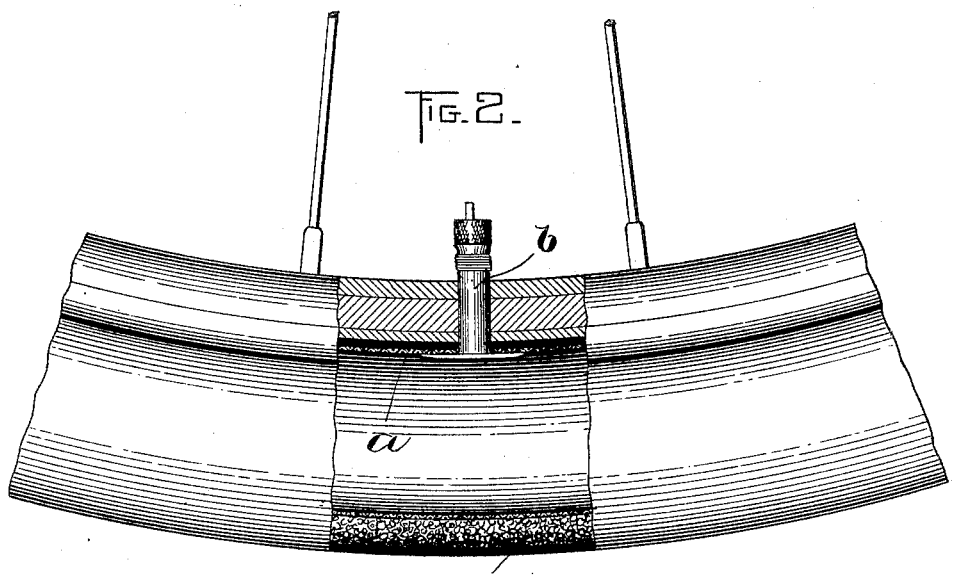
WITNESSES:
A. D. Harrison.
P. W. Pezzetti
INVENTOR:
C. A. Pratt
by Knight Brown & Quinby
Attys.

UNITED STATES PATENT OFFICE.

CHARLES A. PRATT, OF CLINTON, MASSACHUSETTS.

AIR-CUSHIONED TIRE.

SPECIFICATION forming part of Letters Patent No. 599,475, dated February 22, 1898.

Application filed October 15, 1897. Serial No. 655,258. (No model.)

*To all whom it may concern:*

Be it known that I, CHARLES A. PRATT, of Clinton, in the county of Worcester and State of Massachusetts, have invented certain new and useful Improvements in Air-Cushioned Tires, of which the following is a specification.

This invention relates to air-cushioned or pneumatic tires, such as are used for bicycle and other wheels.

The invention has for its object to provide a tire of this character in which the air-confining tube or reservoir shall be protected by a cover which does not unduly increase the weight of the tire and which not only protects the outer portion of the wall of the air-reservoir from liability to be punctured, but also adds materially to the resilience and speed of the tire.

The invention consists in the improvements which I will now proceed to describe and claim.

Of the accompanying drawings, forming a part of this specification, Figure 1 represents a transverse section of my improved tire and a portion of a wheel-rim to which it is applied. Fig. 2 represents a partial side elevation and partial longitudinal section of the parts shown in Fig. 1. Fig. 3 represents an enlarged sectional fragmentary view.

The same letters of reference indicate the same parts in all the figures.

In the drawings, $a$ represents an air receiver or reservoir which is preferably in the form of a continuous tube and is of flexible and at the same time practically inelastic construction, so that when charged with air its diameter will not be increased by the air-pressure beyond a predetermined diameter. The tube or reservoir $a$ may be advantageously constructed of layers of fabric and rubber suitably compounded to form an air-tight and inelastic flexible tube which is equipped with a suitable valve $b$, through which it may be charged with air.

$c$ represents a cover which is applied to the exterior of the air-reservoir $a$ and has the following essential characteristics, namely: First, it is elastic or resilient throughout its entire structure, so that when interposed between the air-charged reservoir $a$ and the ground it will materially add to the resilience of the tire; secondly, its thickness at the part interposed between the reservoir $a$ and the ground is such that the cover constitutes an effectual protector, preventing access of tacks or other sharp-pointed objects to the wall of the air-reservoir, and, thirdly, its weight is reduced to the minimum, so that it does not make the tire unduly heavy. The cover to possess these characteristics is best made of sponge-rubber—that is to say, the entire cover is composed of cellular or spongy rubber, excepting the outer portion, which is provided with a suitable tread-surface, preferably of solid rubber of the same quality as that composing the spongy part and made integral therewith, so that the tread-surface or skin of the cover has substantially the same elasticity as the inner spongy portion. In the enlarged sectional view shown in Fig. 3 the spongy portion is shown at 2 and the solid-rubber skin or tread-surface is shown at 3. The cover is preferably crescent-shaped in cross-section and is arranged so that its thicker portion is interposed between the air-reservoir $a$ and the ground. I find that by making a pneumatic tire of an inelastic inner portion or air-reservoir and a cover which is of entirely elastic construction or inherently elastic and is composed of sponge-rubber having a suitable outer skin or tread-surface I combine lightness, resilience, and freedom from liability of the air-reservoir to be punctured to a degree not attained heretofore.

The inelastic inner portion or air-reservoir prevents the compression of the resilient cover by the pressure of the charge of air. Hence the inherent elasticity of the cover remains uniform and is not affected by changes of density of the charge of air.

It will be seen that the cover is inherently elastic or resilient longitudinally of the tire, as well as laterally, and therefore gives the tire that quality which is known as "speed." A tire having this quality enables a bicycle to which it is applied to be more rapidly driven than one in which the material forming the tread-surface is not inherently elastic or resilient.

Having thus explained my invention and described a way of constructing and using the same, although without having attempted to set forth all the ways in which it may be made or all the modes of its use, what I claim is—

An air-cushioned tire comprising a practically non-elastic flexible tube or air-receiver, and an inherently-resilient cover therefor composed of a layer of sponge-rubber having a suitable resilient or elastic tread-surface, said cover having its tread portion of a thickness to prevent access, to the inelastic tube, of any ordinary puncturing means, the said inelastic tube or air-receiver serving to prevent changes in the inherent elasticity of the cover.

In testimony whereof I have signed my name to this specification, in the presence of two subscribing witnesses, this 12th day of October, A. D. 1897.

CHARLES A. PRATT.

Witnesses:
C. F. BROWN,
A. D. HARRISON.